United States Patent
Neisse et al.

(10) Patent No.: US 8,290,145 B2
(45) Date of Patent: Oct. 16, 2012

(54) TRANSITION BETWEEN MASKED REPRESENTATIONS OF A VALUE DURING CRYPTOGRAPHIC CALCULATIONS

(75) Inventors: Olaf Neisse, Augsburg (DE); Jürgen Pulkus, München (DE)

(73) Assignee: Giesecke & Devrient GmbH (DE)

( * ) Notice: Subject to any disclaimer, the term of this patent is extended or adjusted under 35 U.S.C. 154(b) by 236 days.

(21) Appl. No.: 10/570,744

(22) PCT Filed: Sep. 3, 2004

(86) PCT No.: PCT/EP2004/009852
§ 371 (c)(1),
(2), (4) Date: Sep. 27, 2006

(87) PCT Pub. No.: WO2005/024606
PCT Pub. Date: Mar. 17, 2005

(65) Prior Publication Data
US 2007/0058800 A1      Mar. 15, 2007

(30) Foreign Application Priority Data

Sep. 5, 2003 (DE) ................................ 103 41 096

(51) Int. Cl.
*H04L 9/00* (2006.01)
*H04L 9/22* (2006.01)
*H04L 9/28* (2006.01)
*G06F 12/14* (2006.01)

(52) U.S. Cl. .......... 380/28; 713/176; 713/320; 713/189; 713/190; 713/194; 713/162; 713/168; 380/1; 380/29; 380/30; 380/42; 380/207; 380/252; 380/263; 380/268; 380/286; 708/235; 708/446

(58) Field of Classification Search .................. 713/194
See application file for complete search history.

(56) References Cited

U.S. PATENT DOCUMENTS
5,168,521 A    12/1992  Delaporte et al.
(Continued)

FOREIGN PATENT DOCUMENTS
DE    198 22 217 A1    11/1999
(Continued)

OTHER PUBLICATIONS

Abstract of Japanese Patent Publication No. 59-200549, Pub. Date: Nov. 13, 1984, esp@cenet database.

(Continued)

*Primary Examiner* — Nathan Flynn
*Assistant Examiner* — Bryan Wright
(74) *Attorney, Agent, or Firm* — Martine Penilla Group, LLP (57) ABSTRACT

In a method for the transition from a first masked representation of a value to be kept secret to a second masked representation of the value, according to a first aspect of the invention at least one previously calculated table with a plurality of entries is used, and the calculation is carried out depending on at least one veiling parameter, in order to prevent the value to be kept secret from being spied out. According to a second aspect of the invention, at least one comparison table is used, which, for each table index, provides the result of a comparison between a value dependent on the table index and a value dependent on at least one masking value. A computer program product and a device have corresponding features. The invention provides a technique for protecting the transition between masked representations of a value from being spied out, wherein the masked representations are based on different masking rules.

32 Claims, 1 Drawing Sheet

U.S. PATENT DOCUMENTS

| | | | |
|---|---|---|---|
| 5,452,358 A | 9/1995 | Normile et al. | |
| 6,295,606 B1 * | 9/2001 | Messerges et al. | 713/189 |
| 6,914,986 B2 * | 7/2005 | Handschuh | 380/30 |
| 2001/0053220 A1 | 12/2001 | Kocher et al. | |
| 2002/0114451 A1 | 8/2002 | Satterfield | |
| 2003/0044003 A1 * | 3/2003 | Chari et al. | 380/28 |
| 2004/0243563 A1 * | 12/2004 | Heiner et al. | 707/3 |

FOREIGN PATENT DOCUMENTS

| | | |
|---|---|---|
| EP | 1 267 514 A2 | 12/2002 |
| EP | 1 596 527 B1 | 11/2005 |
| FR | 2 828 608 | 2/2003 |
| JP | 59-200549 | 11/1984 |
| JP | 2001-013870 | 1/2001 |
| WO | WO 01/31422 A2 | 5/2001 |
| WO | WO 02/51064 A1 | 6/2002 |
| WO | WO 02/062011 A2 | 8/2002 |

OTHER PUBLICATIONS

Abstract of German Patent Publication No. 198 22 217, Pub. Date: Nov. 25, 1999, esp@cenet database.

J. Coron and L. Goubin, "On Boolean and Arithmetic Masking against Differential Power Analysis," *Proc. CHES 2000*, vol. 1965, 2000, pp. 231-237 (XP-000989986).

Abstract of Japanese Patent Publication No. 2001-013870, Pub. Date: Jan. 19, 2001, Patent Abstracts of Japan.

L. Goubin, "A Sound Method for Switching between Boolean and Arithmetic Masking," *Proc. CHES 2001*, LNCS 2162, 2001, pp. 3-15 (XP-008002644).

T. Messerges, "Securing the AES Finalists Against Power Analysis Attacks," *Proc. FSE 2000*, LNCS 1978, 2001, pp. 150-164.

Abstract of French Patent Publication No. 2 828 608, Pub. Date: Feb. 14, 2003, esp@cenet database.

Abstract of European Patent Publication No. 1 596 527 B1, Pub. Date: Nov. 16, 2005, esp@cenet database.

* cited by examiner

TRANSITION BETWEEN MASKED REPRESENTATIONS OF A VALUE DURING CRYPTOGRAPHIC CALCULATIONS

BACKGROUND OF THE INVENTION

1. Field of the Invention

The invention relates in general to the field of cryptography, and more particularly to the field of protecting cryptographic calculations from being spied out. The invention relates especially to the transition between masked representations of a value, the masked representations being based on different masking rules. The invention is especially suited for use in a portable data carrier such as a smart card, for example, in different designs, or a chip module.

2. Description of Related Art

Encryption methods such as IDEA (International Data Encryption Algorithm), SAFER K-64 and RC5 as well as hash algorithms such as MD5 or SHA-1 execute cryptographic calculations in which payload data and key data are combined with one another by a series of different computing operations. Here, the computing operations $Xor_L$, $Add_M$ and $Mult_M$ are frequently used. The operation $Xor_L$ is the bitwise exclusive-or operation on L bits; this corresponds to the addition in $(Z/2Z)^L$. The operation $Add_M$ is the addition modulo a modulus $M \in Z$, and the operation $Mult_M$ is the multiplication modulo a modulus $M \in Z$. The cases $L=8, 16, 32$ are of particular importance for $Xor_L$, the cases $M=2^8, 2^{16}, 2^{32}$ are of particular importance for $Add_M$, and the cases $M=2^8+1, 2^{16}+1$ are of particular importance for $Mult_M$.

Moreover, a modified multiplication is used in the IDEA method, wherein this modified multiplication is designated by the infix symbol $\otimes$. This IDEA multiplication is defined by $d \otimes d' = I^{-1}(Mult_M(I(d), I(d')))$ for $d, d' \in \{0, \ldots, 2^{16}-1\}$, the modulus $M=2^{16}+1$ and the following "I transformation":

$$I: \{0, \ldots, 2^{16}-1\} \to \{1, \ldots, 2^{16}\},$$

$$I(d) = \begin{cases} 2^{16} & \text{if } \begin{cases} d = 0 \\ d \neq 0 \end{cases} \\ d \end{cases}$$

The IDEA multiplication has cryptographic advantages, because it ensures that the value zero is not contained in the data range of the multiplication $Mult_M$ which is carried out, and moreover, because a prime number is used as the modulus M.

If computing operations such as the ones just mentioned are carried out using unprotected data, an inference can be made back to the operands and the result with the aid of SPA (Simple Power Analysis) or DPA (Differential Power Analysis). In this way, secret information or keys can be spied out. SPA and DPA methods are based on measuring power consumption whilst executing cryptographic calculations using a program-controlled device. In the case of an SPA attack, a single calculation run is analyzed. In a DPA attack, however, a plurality of calculation runs are statistically evaluated. In the choice of words of the present document, related attack methods in which, in addition to or instead of power consumption, at least one other physical parameter is measured, are also referred to as SPA or DPA methods, respectively.

As a measure against such attacks, the opportunity presents itself, to alter the data to be protected from being spied out by a value which, as a rule, is selected randomly. This value is known as a "mask", and the computing algorithm, in accordance with which the data to be protected are processed together with the mask in order to obtain a masked representation of the data to be protected, is, in the present document, referred to as a "masking rule". The cryptographic calculation steps are then carried out using the masked data. If an attacker manages to identify the values processed in the cryptographic calculation steps, then this spying-out relates only to masked representations and not to the data to be protected from being spied out.

The $Xor_L$ masking rule and the $Add_M$ masking rule are frequently employed in veiling or disguising data. In the $Xor_L$ masking rule, referred to also as "Boolean Masking", the value d that is to be protected is represented by a masked representation y with the mask x, which is usually randomly selected, such that $y=Xor_L(x, d)$ holds. In the $Add_M$ masking rule, referred to also as "Arithmetic Masking", the value d to be protected is represented by a masked representation y with the mask x, which is usually randomly selected, such that $0 \leq x \leq M-1$ and $y=Add_M(x, d)$ hold. A minor modification of the $Add_M$ masking rule is the $Sub_M$ masking rule, in which $y=Sub_M(d, x)$ is chosen, wherein $Sub_M(d, x)$ is the smallest non-negative number y for which $Add_M(x, y)=d$ holds.

It is understood that the respective masking rule that is used has to be compatible with the calculation step or the series of calculation steps to be performed. This is the case if, for example, the calculation step or the series of calculation steps, is/are also applicable, with at most minor modifications, to the masked representation of the value to be protected and then essentially result in the masked representation of the result desired. Hence, for example, the $Xor_L$ masking rule is clearly compatible with exclusive-or calculation steps and bit permutations, however not with addition or multiplication operations.

However, in executing complex cryptographic methods, as cited in the introduction, series of calculation steps frequently alternate which are only compatible with different masking rules. Therefore, at the interface between such series of steps, a transition has to be effected between masked representations of a value to be protected which are based on different masking rules. The problem in this case is to design the masking rule transition, such that an attacker cannot obtain any usable information concerning the data to be protected.

Methods for the masking rule transition from a boolean to an arithmetic masking rule and vice versa are known from WO 02/51064 A1. In a first arrangement, a table is used therein, which table, for a fixed given mask, maps a masked representation in accordance with the first masking rule onto the corresponding masked representation in accordance with the second masking rule. In a second arrangement, such a table is applied to sections of values that have a larger bit length than the bit length of the table index. Furthermore, in this case, a carry table is employed.

The article "*On Boolean and Arithmetic Masking against Differential Power Analysis*" by J. S. Coron and L. Goubin, published in the conference proceedings of the "*Workshop on Cryptographic Hardware and Embedded Systems* 2000 (*CHES* 2000)", vol. 1965 of "*Lecture Notes in Computer Science*", Springer-Verlag, 2000, pp. 231-237, describes a method for the transition from a boolean to an arithmetic masking rule in which a mask, depending on a veiling parameter, enters into the course of calculation either complemented or non-complemented. In this article, reference is made to a possible DPA attack against this method.

From the article "*A Sound Method for Switching between Boolean and Arithmetic Masking*" by L. Goubin, published in the conference proceedings of the "*Workshop on Cryptographic Hardware and Embedded Systems* 2001 (*CHES* 2001)", vol. 2162 of "*Lecture Notes in Computer Science*", Springer-Verlag, 2001, pp. 3-15, calculation methods are known for the transition between boolean and arithmetic masking rules, which, in said article, are referred to as being secure from DPA attacks.

DE 198 22 217 A1 describes a method for protecting data from being spied out in which the masking is reverted before operations are carried out which are not compatible with the masking rule used.

The plurality of different information sources of which the attacker can potentially make use, is a particular difficulty in protecting the masking rule transition from being spied out. There is the problem that, during the course of the calculation, both the states of variables and the state changes of variables as well as the status bits of a processor, and the changes thereof, should be kept statistically independent from the data to be protected. In this respect, "status bits" refer to those processor register bits (flags) which indicate for example, a carry, or the occurrence of a negative number, or another property that is dependent on a calculation result. If merely one of these potential sources of information is not blocked, then there continues to be the risk of a successful DPA analysis.

The considerable resource restriction which is present, in particular, in smart cards and other portable data carriers, presents a further difficulty. It would be desirable to design the masking rule transition with regard to the necessary computing power as well as with regard to the memory space necessary for the program and for auxiliary data as efficiently as possible and as economical as possible in terms of storage, respectively.

SUMMARY OF THE INVENTION

Accordingly, the invention has the object of solving the problems mentioned above, wholly or in part. In particular, the invention should provide a technique for protecting the transition between masked representations of a value, the masked representations being based on different masking rules, from being spied out. In some embodiments, this technique is to be particularly adapted to the actual conditions present in portable data carriers.

In accordance with the invention, the above object is achieved, wholly or in part, by a method for the transition from a first masked representation of a value to be kept secret to a second masked representation of the value, wherein the value to be kept secret is prevented from being spied out, wherein the first masked representation is based on a first masking rule having a first mask and the second masked representation is based on a second masking rule having a second mask, and wherein, in calculating the second masked representation, at least one previously calculated table having a plurality of entries is used and the calculation is carried out dependent on at least one veiling parameter.

Further in accordance with the invention, the above object is achieved, wholly or in part, by a method for the transition from a first masked representation of a value to be kept secret to a second masked representation of the value, wherein the value to be kept secret is prevented from being spied out, wherein the first masked representation is based on a first masking rule having a first mask and the second masked representation is based on a second masking rule having a second mask, the method comprising the step of executing a calculation using at least one comparison table which provides, for each table index, the result of a comparison between a value dependent on the table index and a value dependent on at least one masking value.

The invention also comprises corresponding computer program products and corresponding devices. The dependent claims define optional features of some embodiments of the invention.

The invention, according to a first aspect, is based on the fundamental idea that in calculating the second masked representation at least one previously calculated table is used and that the calculation is carried out depending on at least one veiling parameter. Surprisingly, by means of this combination, the data to be kept secret can be securely prevented from being spied out.

The invention, according to a second aspect, is based on the fundamental idea of using at least one comparison table, which, for each table index, provides the result of a comparison between a value dependent on the table index and a value dependent on at least one masking value. By using such a table, it is also possible to protect a calculation from being spied out with acceptable memory requirements.

The transition in accordance with the invention is carried out from a first masking rule to a second masking rule and from a first mask to a second mask. Normally, the first masking rule is different from the second masking rule, as otherwise, no masking rule transition would be necessary. The first mask and the second mask can be the same or different. In preferred embodiments the second mask is freely selectable; it can, for example, be an input parameter of the transition method. In this way, the security of the cryptographic calculation can be further increased as, in addition to the masking rule transition, a mask transition is carried out to a freshly selected second mask, e.g., a randomly selected second mask.

In some embodiments the table or tables used can be predefined and, for example, be loaded into the data carrier in the course of initializing or personalizing the data carrier. Preferably, however, the table or tables is/are calculated and stored in a preparatory method step. Said method step can take place immediately before the masking rule transition, or it can take place some time before the masking rule transition. A table or a set of tables can be used for several masking rule transitions, wherein it may be advisable, however, for security reasons, to calculate new tables or sets of tables from time to time or after a predetermined number of transitions.

A particularly high degree of security is attained if each entry in the table, or in at least one of the tables, respectively, is dependent on at least one predetermined masking value. This masking value, or each of the masking values, respectively, is/are preferably determined randomly. In some embodiments, the masking value can be considered as a further mask to which the table is adapted.

For increasing the degree of security from being spied out, provision can also be made for using, during the course of the computation, at least one intermediate result for a further computation step, wherein the intermediate result is used, depending on the veiling parameter, either in a complemented way or in a non-complemented way.

If a comparison table is used, then in preferred embodiments a value which enters into the comparison result stored in the table is dependent either on the complemented or on the non-complemented masking value. In this way, the course of calculation and the data processed during the calculation are further veiled. The comparison table can be designed to be particularly economical in terms of memory requirements if each entry provides a comparison result in the form of a binary value, that is to say a single bit.

In order to achieve acceptable memory requirements for storing the table, the table preferably comprises far fewer entries than could be addressed by the bit length of the masked representations and/or masks. In preferred embodiments, repeated accesses to the table then take place, wherein, for each access, some bits of an intermediate result are evaluated and form the basis for the access to the table. In such embodiments, the bit length of the masked representations and/or masks is a multiple—preferably an integer multiple—of the bit length of the table index, that is to say, the logarithm to the base 2 of the number of addressable entries in the table.

Also, in a comparison table, the bit length of the table index is preferably considerably less than the bit length of the variables used in the course of the calculation. In preferred embodiments, the comparison table is then applied repeatedly to successive bit sections of an intermediate result in order to determine a carry value for each bit section. The carry values determined in this way can be evaluated individually, or they can be combined into a common carry value for the overall calculation.

In advantageous embodiments of the invention, while maintaining the first masking rule, a transition from the first to a third mask initially takes place, wherein the third mask is tailored to the arrangement of the at least one table. The at least one table is then used to carry out the transition to the second masking rule. With it, in some embodiments, a transition goes along to a fourth mask, the transition being predetermined by the arrangement of the table. Therefore, in a further step, whilst preferably maintaining the second masking rule, the masked representation is changed, such that it is based no longer on the fourth mask, but on the desired second mask. Embodiments of this method are also contemplated in which the first mask and the third mask are identical and/or the second mask and the fourth mask are identical.

The computer program product in accordance with the invention has program instructions in order to implement the method in accordance with the invention. Such a computer program product can be a material medium, e.g., a semiconductor memory, a diskette or a CD-ROM. The computer program product can however also be a non-material medium, e.g., a signal conveyed via a computer network. The computer program product can, in particular, contain program instructions which, in the course of manufacturing, initializing or personalizing a portable data carrier, are introduced into such.

The device in accordance with the invention can, in particular, be a portable data carrier, e.g., a smart card or a chip module. Such a data carrier comprises in a way that is known as such, at least one processor, several memories formed in different technologies and various auxiliary assemblies such as, for example, interface circuits, timing generators and connecting elements.

In preferred further developments, the computer program product and/or the device comprise(s) features which correspond to the features mentioned in the present description and/or the features recited in the dependent method claims.

BRIEF DESCRIPTION OF THE SECTIONS OF THE SPECIFICATION

Figure 1:
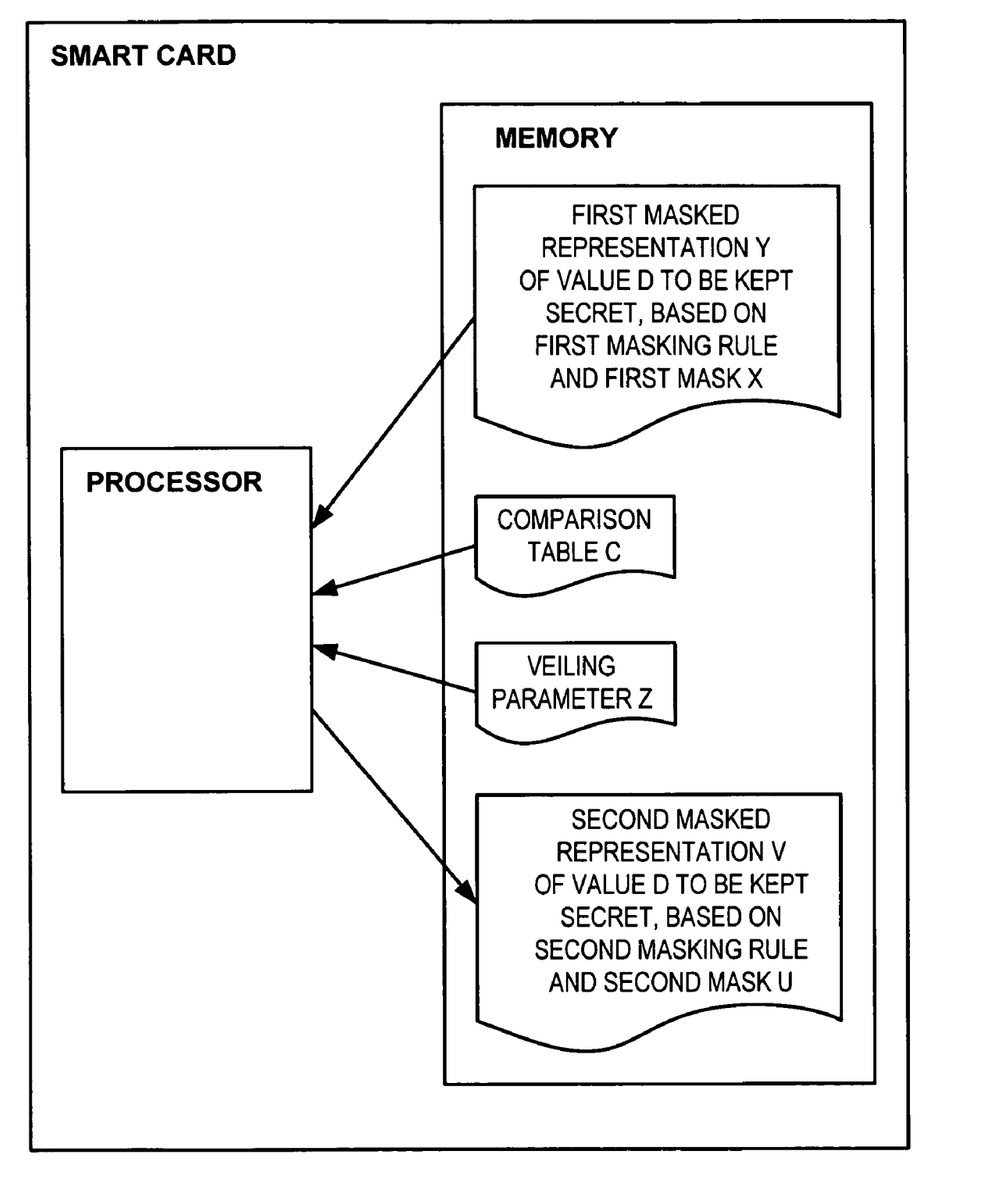
The FIGURE is a block diagram that illustrates a smart card in accordance with one embodiment of the invention.

Further features, objects and advantages of the invention are apparent from the following description of several sample embodiments and alternative embodiments. The following sections A-G relate to:
Section A a comparison example of a method for the transition from an $Add_{2^L}$ masking rule to a $Xor_L$ masking rule,
Section B a first sample embodiment of the invention for the transition from the $Add_{2^L}$ masking rule to the $Xor_L$ masking rule,
Section C a second sample embodiment of the invention for the transition from the $Add_{2^L}$ masking rule to the $Xor_L$ masking rule,
Section D a sample embodiment of the invention for the transition from the $Add_{2^L}$ masking rule to an $Add_{2^{L}+1}$ masking rule,
Section E a sample embodiment of the invention for the transition from the $Add_{2^{L}+1}$ masking rule to the $Add_{2^L}$ masking rule,
Section F a sample embodiment of the invention for the transition from an $Add_{2^L}$ masking rule to an I(−)masking rule, and
Section G a sample embodiment of the invention for the transition from the I(−)masking rule to the $Add_{2^L}$ masking rule.

Detailed Description of Exemplary Embodiments

The following names and notations are used in the present document:
N Set of natural numbers
Z Set of integers
V(L) The set of bit sequences of length L for L in N. A bit sequence $x \in V(L)$ is also considered as a number in the range $0, 1, \ldots, 2^L-1$ by virtue of the mapping $(x_{L-1}, \ldots, x_0) | \rightarrow x_{L-1}2^{L-1} + \ldots + x_0$, such that V(L) is equated with the set of numbers $\{0, 1, \ldots, 2^L-1\}$.
x[i] The $i^{st/nd/rd/th}$ bit $x_i$ of $x=(x_{L-1}, \ldots, x_0) \in V(L)$ for $i=0, \ldots, L-1$.
$x \oplus_L y$ Infix notation for $Xor_L(x,y)$.
$x +_L y$ Infix notation for $Add_L(x,y)$.
$Sub_L(x,y)$ The smallest non-negative number z for which $y +_L z = x$ holds.
$x -_L y$ Infix notation for $Sub_L(x,y)$.
$\bar{x}$ The one's complement $x \oplus_L (1, \ldots, 1)$; often, simply the term "complement" is used in the present document instead of "one's complement".
$\mathbf{1}(x, y)$ Indicator function for x, y in Z, the indicator function having the value 1 if and only if $x<y$ applies, otherwise having the value 0.
$(x|y)$ Concatenation of the bit sequences of x and y.

A. Transition from $Add_{2^L}$ to $Xor_L$ (Comparison Example)

The methods described in sections A-C relate in each case to the transition from an $Add_{2^L}$ masking rule to an $Xor_L$ masking rule. Let L in N and $M=2^L$; in practice, the value of L is 8 or 16 or 32 in most cases.

The input parameters of the three methods described in sections A-C are in each case values x, y and u, wherein y is a masked representation of a secret value $d \in V(L)$ with an $Add_M$ masking rule and a mask x; that is to say that $x +_M d = y$ holds. The value $u \in V(L)$ designates the mask, relating to which the masked representation that is to be newly calculated is to be expressed after the the masking rule transition.

As their respective outputs, the methods described in sections A-C in each case generate a value $v \in V(L)$, which represents the masked representation of the secret value d with the $Xor_L$ masking rule and the mask u; that is to say that $u \oplus_L v = d$ holds.

The method described as a comparison example in the present section A, works using a "large" table. Due to the high demand in memory space as well as the large amount of time involved in calculating the table, this method, when executed by a portable data carrier, is at most practicable for small L values, e.g., up to L=8. The description given here serves primarily to give a better understanding of the sample embodiments that will be described in sections B-G.

In the method described here, a table T, is generated in preparatory steps (A.a) and (A.b), the entries of which relate to the transition from the $Add_{2^L}$ masking rule, with a mask r selected randomly, to the $Xor_L$ masking rule, with a mask s selected randomly. The random numbers r, s are also referred to as "masking values":

(A.a) Select random numbers r, s ∈ V(L).
(A.b) Generate the table $T[0, \ldots, 2^L-1]$ with:

$$T(i) = Xor_L(Sub_M(i, r), s) \text{ for } i = 0, \ldots, (2^L-1).$$

The masking rule transition takes place in the following steps (A.1)-(A.3). In step (A.1), the masked representation y is converted from the original mask x into the mask r given by the table T. In step (A.2), the transition from the $Add_{2^L}$ masking rule to the $Xor_L$ masking rule takes place by means of an access to the table. In step (A.3), the intermediate result o gathered from the table T is converted from the mask s, as given by the table T, into a masked representation with respect to the desired mask u:

(A.1) Calculate $i = Sub_M(Add_M(y, r), x)$.
(A.2) Set $o = T(i)$.
(A.3) Calculate $v = Xor_L(s, Xor_L(o, u))$.

The method prevents DPA attacks. In executing the method, the states and state transitions of the status bits of a processor are, in particular, independent from the secret value d.

The methods described in the following sections B-G represent a significant further development of the method which is presently described. In particular, "smaller" tables are used in these methods, and the calculation of mask transition elements i and o is made up of several table access operations.

The following remarks regarding possible modifications of the method described here are analogously applicable to the methods described in sections B-G.

In an alternative embodiment, provision can be made for the table T to be constructed using $T(i) = Xor_L(Add_M(i, r), s))$ instead of $T(i) = Xor_L(Sub_M(i, r), s)$. In this case, it is understood that the further calculations need to be adapted correspondingly.

In a further alternative embodiment, the calculation $i = Add_M(Sub_M(r, x), y)$ can also be made in step (A.1) instead of $i = Sub_M(Add_M(y, r), x)$. In each case, both operations should not be executed immediately one after the other. Rather, it is advantageous to delete the status register of the processor in an intermediate step, as otherwise the change of the carry bit would be dependent on the data.

Instead of $v = Xor_L(s, Xor_L(o, u))$ in step (A.3), the calculation $v = Xor_L(o, Xor_L(s, u))$ can also be made with the same effects in alternative embodiments.

Moreover, in alternative embodiments of the method, some calculation steps can be saved if x=r and/or u=s is/are used.

B. Transition from $Add_{2^L}$ to $Xor_L$ (1$^{st}$ Sample Embodiment)

In the sample embodiment to be described now, the method of section A is adapted to the effect that, instead of a "large" table, a "small" conversion table T and an additional comparison table C are used. The comparison table C contains information concerning a carry which occurs in certain calculation steps. Each entry in comparison table C is made up of only one single bit. In a concrete implementation of the method, for example, each eight table entries can be summarized into one memory byte, or the comparison table C can be set up using bits which are not needed in other data structures.

The size of the tables T and C is usually fixed when implementing the methods described here. For this purpose, the number l of bits processed in each conversion run is selected as a "small" factor of L. In the present sample embodiment, l is the bit width of the table index i, and the number of entries in each table T, C amounts to $2^l$. Moreover, the entries of the conversion table T have the bit width l. In typical implementations, for example, the values (L, l)=(32, 8), (16, 8) or (16, 4) can be used. Furthermore, let k=L/l and $m=2^l$. In variant embodiments, provision can be made for the size $2^l$ of the table not to be fixed completely during implementation, but instead to determine the value l—possibly depending on a suitable parameter—only at run time.

In selecting the value l, it should be considered that small values l cause a lot of computing effort in the mask transition method and little computing effort in the preparation; for large values of l, the reverse is the case. Moreover, the expenditure in terms of memory requirements for the tables T and C is all the smaller, the smaller the selected value l is. In all, value l should, as a rule, be fixed such that, with acceptable memory requirements, the entire computing time needed is as small as possible.

If the natural embedding from $\{0, \ldots, M-1\}$ into $\{0, \ldots, 2^{L'}-1\}$ and the natural projection from $\{0, \ldots, 2^{L'}-1\}$ to $\{0, \ldots, M-1\}$ for a value L'>L are used, respectively, then a factorization L'=kl can also be used in alternative embodiments. For example, this is advantageous in cases where L has no suitable factor l. It is understood that the points made in the current paragraph and the two previous paragraphs are also correspondingly applicable for the methods described in sections C-G.

Steps (B.a)-(B.c) are executed in preparing the method described here. In steps (B.a) and (B.b), the masking values r, s and the veiling parameter z are selected randomly, and in step (B.c), the tables T, C are drawn up based on these values. In calculating both tables T, C, in step (B.c), the masking values r, s are used in a complemented way if the veiling parameter z has the value "1", and the masking values r, s are used in a non-complemented way if the veiling parameter z has the value "0":

(B.a) Select two random numbers r, s ∈ V(l) as masking values.
(B.b) Select a random bit z∈ {0, 1} as a veiling parameter.
(B.c) Generate the tables $T[0, \ldots, m-1]$ and $C[0, \ldots, m-1]$ with:

$$T(i) = Xor_l(Sub_m(i, r \oplus_l (\overset{l}{\overline{z|\ldots|z}})), s \oplus_l (\overset{l}{\overline{z|\ldots|z}})) \text{ for } i = 0,$$
$$\ldots, (m-1), \text{ and}$$

$$C(i) = l(i, r \oplus_l (\overset{l}{\overline{z|\ldots|z}})) \text{ for } i = 0, \ldots, (m-1).$$

The masking rule transition is performed by the following steps (B.1)-(B.10). In this respect, in steps (B.1) and (B.3) different calculations are carried out depending on the value of the veiling parameter z. Steps (B.5)-(B.9) form a loop in which an l bit wide section of two L bit wide intermediate results g and y' is processed in each pass. As a result, l bits of the masked representation v to be calculated are determined in each loop pass:

(B.1) Calculate $g = Xor_L(Sub_M((\overset{k}{\overline{r|\ldots|r}}), x), (\overset{L}{\overline{z|\ldots|z}}))$;
let $g = (g_k|\ldots|g_l)$ (B.2) Calculate $h = Xor_L((\overset{k}{\overline{s|\ldots|s}}), u)$; let $h = (h_k|\ldots|h_l)$.

(B.3) Calculate $y' = y \oplus_L (\overset{L}{\overline{z|\ldots|z}})$; let $y' = (y_k'|\ldots|y_l')$.

(B.4) Set c=0 and c̃=0.
(B.5) For j=1, ..., k execute a loop with steps (B.6)-(B.9):
(B.6) Calculate $i = y_j' +_m \tilde{c} +_m g_j$, and set c̃ as the carry bit of the addition $y_j' + \tilde{c} + g_j$ with carry modulo m.

(B.7) Calculate $i=Sub_m(i, c)$, and set c as the carry bit or borrow bit of the subtraction.

(B.8) Set $o=T(i)$ and $c=cvC(i)$.

(B.9) Calculate $v_j=Xor_l(h_j, o)$.

(B.10) Set $v=(v_k | \ldots | v_1)$.

The method described here prevents DPA attacks as, during the course of calculation, both bits c and $\tilde{c}$ as well as all of the status bits of the processor executing the calculation as well as the intermediate results are independent of the secret value d, provided that the random values x, u, r, s, z vary independently.

As a rule, if several masking rule transitions are necessary in a cryptographic method, preparatory steps (B.a)-(B.c) need only be executed once, at the start. The tables T and C can then be used for each masking rule transition, whereby the overall expenditure is considerably reduced. When the same masks x and/or u are used for a number of masking rule transitions, then steps (B.1) and/or (B.2) can be performed for all of these transitions together as preparatory steps.

In variant embodiments, provision can be made for the table T to be defined using $T(i)=Xor_l(Add_m(i, r \ldots), s \ldots)$ instead of using $T(i)=Xor_l(Sub_m(i, r \ldots), s \ldots)$. In this case, the definition of c and the computation steps of the further method have to be correspondingly adjusted, of course.

According to a further alternative embodiment, the value g in step (B.1) can also be written as an expression in r and y instead of an expression in r and x, if the corresponding adjustments are made to the further computation steps.

The method can moreover be modified to the effect that, in steps (B.1) and (B.2), instead of working using $(r | \ldots | r)$ and $(s | \ldots | s)$, k different values are used for each of the masking values, that is to say, use is made of $(r_k | \ldots | r_1)$ and $(s_k | \ldots | s_1)$. In this case, it is necessary, however, to generate and to store a corresponding number of tables $T_i$ and $C_i$ ($i=1, \ldots, k$).

Steps (B.1)-(B.3) are, in the method described here, calculations on V(L). In alternative embodiments, each of these steps can be executed, respectively, by k operations on V(l).

As an alternative to step (B.6), $(i_k | \ldots | i_1) = Sub_M(y, g)$ can also be computed before executing the loop. In this case, $i=i_j$ can then be set in the body of the loop, in each pass. This calculation process, however, offers less protection against DPA attacks.

As an alternative to the one-off generation of the random bit z as the veiling parameter in the preparatory step (B.b), the veiling parameter z can also be freshly randomly selected only in each masking rule transformation. The necessary modifications for this alternative are explained in the following section C.

C. Transition from $Add_{2^L}$ to $Xor_L$ ($2^{nd}$ Sample Embodiment)

In the method described in previous section B, the one bit wide comparison table C is generated in addition to the table T, which comprises V(l) values. If the value l is the same as the word width of the processor used, or is an integer multiple or an integer factor thereof, finding a suitable data structure for the table C can be problematic. The method described in the present section is therefore, in contrast to the method of section B, adapted such that the entries in the table T only have a bit width of l-1. This has the advantage that both tables T and C can be set up in a single field in memory, the field having m entries of l bits each.

Again, the method uses values l, k and m as starting points which, as a rule, have been fixed when implementing the method as a design decision. As in section B, let the value l be a "small" factor of L, for example, (L, l)=(32, 8), (16, 8), (16, 4), and let k=L/l and $m=2^l$. The following steps (C.a) and (C.b) are executed in preparation:

(C.a) Select random numbers $r \in V(l)$ and $s \in V(l-1)$ as masking values.

(C.b) Generate the tables $T[0, \ldots, m-1]$ and $C[0, \ldots, m-1]$ with:

$$T(i)=Xor_{l-1}(Sub_m(i, r)\!>\!>\!1, s) \text{ for } i=0, \ldots, (m-1), \text{ and}$$

$$C(i)=1(i, r) \text{ for } i=0, \ldots, (m-1).$$

The operation "$Sub_m(i, r)\!>\!>\!1$" in step (C.b) designates, in this case, shifting its operand $Sub_m(i, r)$ by one bit position, namely to the right or to the left, respectively, such that the least significant bit is lost.

The masking rule transition is executed by the following steps (C.1)-(C.12). In the method described in section B, steps (C.1) and (C.2) are already executed in association with the preparatory steps (B.b) and (B.c), whereas steps (C.3)-(C.12) correspond roughly to steps (B.1)-(B.10):

(C.1) Select a random bit $z \in \{0, 1\}$ as a veiling parameter.

(C.2) set $r' = r \oplus_l (\overline{z | \ldots | z}^{\,l}), s' = s \oplus_l (\overline{z | \ldots | z}^{\,l})$.

(C.3) Calculate $g = Xor_L(Sub_M((\overline{r' | \ldots | r'}^{\,k}), x), (\overline{z | \ldots | z}^{\,L}))$;

let $g = (g_k | \ldots | g_l)$.

(C.4) Calculate $h = Xor_L(((\overline{s' | r'[0] | \ldots | s' | r'[0]}^{\,k})), u)$;

let $h = (h_k | \ldots | h_l)$.

(C.5) Calculate $y' = y \oplus_L (\overline{z | \ldots | z}^{\,L})$; let $y' = (y_k' | \ldots | y_l')$.

(C.6) Set c=0 and $\tilde{c}=0$.

(C.7) For $j=1, \ldots, k$ execute a loop with steps (C.8)-(C.11):

(C.8) Calculate $i=y_j' +_m \tilde{c} +_m g_j$, and set $\tilde{c}$ as the carry bit of the addition $y_j' + \tilde{c} + g_j$ with carry modulo m.

(C.9) Calculate $i=Sub_m(i, c)$, and set c as the carry bit or borrow bit of the subtraction.

(C.10) Set $o=T(i)$ and $c=cv(i)$.

(C.11) Calculate $v_j=Xor_l(h_j, (o | i[0]))$.

(C.12) Set $v=(v_k | \ldots | v_1)$.

As the table T in the present method contains values from V(l-1), there is space left in each entry for an additional bit each, which can be used for storing the value of the table C. Step (C.10) can then be executed with a single memory access operation. In all, the method is therefore particularly efficient with regards to computational arithmetic and storage access.

The notes made in the previous section B concerning the method described there apply analogously to the present method.

In step (C.1) of the method described here, the veiling parameter z is freshly selected for each mask transformation as a random bit. This technique can be used analogously for the method according to section B. On the other hand, the technique described in section B, namely the technique of randomly selecting the veiling parameter z as early as in the preparatory steps and letting the veiling parameter z influence the tables T and C, can also be used in an alternative embodiment of the method which is presently described.

Instead of the value r'[0], a random bit can, in an alternative embodiment, also be employed in step (C.4) in the calculation of h. Said random bit must then also be used instead of i[0] in step (C.11).

D. Transition from $\text{Add}_{2^L}$ to $\text{Add}_{2^L+1}$

Sections D and E relate to the transition between the $\text{Add}_{2^L}$ masking rule and the $\text{Add}_{2^L+1}$ masking rule. The following two observations will be used for M in N, wherein observation (*) is relevant for the present section and observation (**) is relevant for section E:

(*) For a, d ∈ $\{0, 1, \ldots, M-1\}$, let b=$\text{Add}_M$(d, a) and c=1(b, a). Then, $\text{Add}_{M+1}$(d, a)=$\text{Sub}_{M+1}$(b, c).

(**) For a, d ∈ $\{0, 1, \ldots, M\}$, let b=$\text{Add}_{M+1}$(d, a) and c=1(b, a). Then, $\text{Add}_M$(d, a)=$\text{Add}_M$(b, c).

It can be derived from observations (*) and (**) that the comparison result c depends significantly on value d to be kept secret. There is therefore the problem of calculating $\text{Sub}_{M+1}$(b, c) or $\text{Add}_M$(b, c), respectively, such that there is no correlation between the secret value d and the intermediate results and/or the status bits of a processor, which result from the individual steps of the computation.

If the calculation of 1(b, a) is supported by a comparison instruction of the processor which is secure against DPA, then the masking rule transition can take place in both directions according to observations (*) and (**). In this respect, the values are preferably used in a complemented or a non-complemented way, depending on a random bit.

However in view of the matter at hand, it should be supposed that the power consumption of the processor when executing a comparison instruction depends on the result of the comparison or the difference b−a, respectively. The methods described in the present section and in the following section perform the masking rule transition for modulus values that have the form of $M=2^L$, L in N, in a way that is secure against DPA. Such modulus values are usual in practice; frequently L=8 or L=16 or L=32 holds. The memory space requirements of the methods are moderate.

The method described in the present section receives three values x, y and u as input parameters, wherein y is a masked representation of a secret value d ∈ V(L) with the $\text{Add}_M$ masking rule and a mask x; that is to say that $x+_M d=y$ holds. The value u ∈ $\{0, 1, \ldots, M\} \subset V(L+1)$ provides the mask, relating to which the masked representation to be freshly calculated is to be expressed after the masking rule transition. As an output, the method generates a value v ∈ V(L+1) which represents the masked representation of the secret value d using the $\text{Add}_{M-1}$ masking rule and the mask u; that is to say that $u+_{M+1} d=v$ holds.

Again, a comparison table C is generated in the preparatory method steps (D.a)-(D.c), the calculation of which is based on a randomly selected veiling parameter z and a randomly selected masking value r. In this case, a "small" factor l of L, e.g. (L, l)=(32, 8), (16, 8), (16, 4) has been fixed when implementing the method. In the following, the value L/l is referred to as k. The maximum value of the table index i is referred to as m with $m=2^l$; the comparison table C comprises m+1 entries, each entry having one bit:

(D.a) Select a random bit z ∈ $\{0, 1\}$ as a veiling parameter.

(D.b) Select a random number r ∈ V(l) as a masking value and $$\text{set } a = (\overset{k}{\overline{r|\ldots|r}}) \in V(L).$$

(D.c) Generate the comparison table $C[0, \ldots, m]$ with:

$$C(0) = 1 \text{ and}$$

$$C(i) = l\left(i - 1, r \oplus_l (\overset{l}{\overline{z|\ldots|z}})\right) \text{ for } i = 1, \ldots, m.$$

The masking rule transition is executed by the following steps (D.1)-(D.9). In this case, in step (D.1) a masked representation b of the value d is calculated using the mask a. Steps (D.4) and (D.5) form a loop, in the course of which the comparison value c is calculated, expressed in a veiled form as c' with $c'=c\oplus_1 z$. In steps (D.6)-(D.8) the transition to the masking rule $\text{Add}_{M+1}$ is carried out according to observation (*) by calculating the value $\text{Sub}_{M+1}$(b, c) in a veiled way. In step (D.9), while maintaining the $\text{Add}_{M+1}$ masking rule, the mask a is transformed into the desired mask u:

(D.1) Calculate value b=$\text{Add}_M$(d, a) from x, y and a.

(D.2) Set $b' = b \oplus_L (\overset{L}{\overline{z|\ldots|z}})$; let $b' = (b'_k|\ldots|b'_1)$.

(D.3) Set c'=z.

(D.4) For j=1, ..., k execute a loop with step (D.5):

(D.5) Set $c'=C(b'_j+1-c')$.

(D.6) Set u'=u, if z=0, and u'=$\text{Sub}_{M+1}$(M+1, u), if z=1.

(D.7) Calculate u'=$\text{Sub}_{M+1}$(u, c).

(D.8) Set u'=u', if z=0, and u'=$\text{Sub}_{M+1}$(M, u'), if z=1.

(D.9) Calculate v=$\text{Sub}_{M+1}$($\text{Add}_{M-1}$ (u', b), a).

Similar to the methods according to sections B and C, it is also advisable, in the present method, to execute the calculation of $(b'_k|\ldots|b'_1)$ in steps (D.1), (D.2) and/or the calculation of $v=(v_k|\ldots|v_1)$ in step (D.9) individually for each $b'_j$ and $v_k$, respectively. This can also be done within the loop formed by steps (D.4) and (D.5).

In the veiled calculation of $\text{Sub}_{M+1}$(b, c), c is subtracted from u in steps (D.6)-(D.8), and is then added to b. In this case, the relation $c=c'\oplus_1 z$ is used. Care should be taken that c is not processed unmasked and also, that no other dependencies between z and c' arise.

All calculations can be implemented without problems such that there are no case distinctions that depend on data or random numbers. If a masking rule transition from $\text{Add}_M$ to $\text{Xor}_L$ is also necessary in the course of the cryptographic method, and if one of the methods described in sections B or C is used for this purpose, then the table C would already exist, up to the first entry which is to be added, provided that the same parameter l is chosen.

The method, when implemented carefully, prevents DPA attacks as all values c' and the status bits of the processor which are set and cleared during the course of the calculation, are independent from the value d to be protected.

As an alternative to the one-off generation of the random bit z as a veiling parameter in preparatory step (D.a), the veiling parameter z can also be freshly randomly selected for each masking rule transformation. The necessary modifications for this are explained in the following section E; they are correspondingly applicable to the method described in the present section as well.

E. Transition from $\text{Add}_{2^L+1}$ to $\text{Add}_{2^L}$

The method described in the present section executes a masking rule transformation in a direction opposite to the direction of the method of section D. The present method uses observation (**) of previous section D.

Let L in N, and let $M=2^L$. The method receives the values x, y and u as input values, wherein y is a masked representation of a secret value d ∈ $\{0, 1, \ldots, M\} \subset V(L+1)$ with the $\text{Add}_{M+1}$ masking rule and the mask x; that is to say that $x+_{M+1} d=y$ holds. The value u ∈ V(L) provides the mask of the masked representation to be calculated. As its output, the method generates a value v ∈ V(L) for which $u+_M d=v$ holds.

In other words, v is the masked representation of the secret value d using the $\text{Add}_M$ masking rule and the mask u.

The method is described here using parameters l, k and m, the values of which have already been fixed, as a rule, when implementing the method. The value l is a "small" factor of L, e.g. (L, l)=(32, 8), (16, 8) or (16, 4). The values k and m are given by k=L/l and m=$2^l$. In preparatory steps (E.a) and (E.b) of the method, a comparison table C is generated for a randomly selected masking value r:

(E.a) Select a random number r ∈ V(l) as a masking value.
(E.b) Generate the table C[0, ..., m] with:

$C(0)=1$ and $C(i)=1(i-1, r)$ for $i=1, \ldots, m$.

The masking rule transition is executed by the following steps (E.1)-(E.11). A veiling parameter z is determined in step (E.1), the veiling parameter z also influencing the following computations. In step (E.3) a masked representation b of the value d is calculated using a mask a, formed from r and z. Steps (E.6) and (E.7) form a loop, in the course of which the comparison value c is calculated, expressed in a veiled form as c'. In steps (E.8)-(E.10), the transition to the masking rule $\text{Add}_M$ is carried out according to observation (**) by calculating the value $\text{Add}_M$(b, c) in a veiled way. In step (E.11), while maintaining the $\text{Add}_M$ masking rule, the mask a is transformed into the desired mask u:

(E.1) Select a random bit z ∈ {0, 1} as a veiling parameter.

(E.2) Set $r' = r \oplus_l \overbrace{(z|\ldots|z)}^{l} \in V(l)$ and $a = \overbrace{(r'|\ldots|r')}^{k} \in V(L)$.

(E.3) Calculate the value b=$\text{Add}_{M+1}$(a, d) from x, y and a; let b=$(b_{k+1}|b_k| \ldots |b_1)$ with $b_{k+1} \in \{0, 1\}$ and $b_k, \ldots, b_1 \in$ V(l).

(E.4) Set $b' = (b_k|\ldots|b_1) \oplus_L \overbrace{(z|\ldots|z)}^{L}$; let $b' = (b'_k|\ldots|b'_1)$.

(E.5) Set c'=$z \oplus_1 b_{k+1}$.
(E.6) For j=1, ..., k execute a loop with step (E.7):
(E.7) Set c'=C($b'_j$+1-c').
(E.8) Set u'=u, if z=0, and u'=$\text{Sub}_M$(M-1, u), if z=1.
(E.9) Calculate u'=$\text{Add}_M$(u', c'$\oplus_1 b_{k+1}$).
(E.10) Set u'=u', if z=0, and u'=$\text{Sub}_M$(M, u'), if z=1.
(E.11) Calculate v=$\text{Sub}_M$($\text{Add}_M$(u', b), a).

Similar to the methods according to sections B and C, it is also advisable in the present method to execute the calculation of (b'$_k$| ... |b'$_1$) in steps (E.3), (E.4) and/or the calculation of v=(v$_k$| ... |v$_1$) in step (E.11) individually for each b'$_j$ and v$_k$, respectively. This calculation can also take place within the loop formed by steps (E.6) and (E.7).

In the veiled calculation of $\text{Add}_M$(b, c), in steps (E.8)-(E.10), c is added to u, which is then added to b. In this case, the relation c=c'$\oplus_1 b_{k+1} \oplus_1$z is used. Care should be taken that c is not processed unmasked and also, that no other dependencies between z and c occur.

All calculations can be implemented without problems such that there are no case distinctions that depend on data or random numbers. If a masking rule exchange from $\text{Add}_M$ to $\text{Xor}_L$ is also necessary in the course of the cryptographic method, and if one of the methods described in sections B or C is used for this purpose, then the table C would already exist, up to the first entry which is to be added, provided that the same parameter l is chosen.

In an alternative embodiment, step (E.8) can be implemented as $$u' = u \oplus_L \overbrace{(z|\ldots|z)}^{L};$$

a corresponding modification is also possible for the method described in section D.

In the method described here, the veiling parameter z is freshly selected in step (E.1) as a random bit for each mask transformation. This technique can be used analogously in the method according to section D. On the other hand, the technique described in section D, namely the technique of randomly selecting the veiling parameter z as early as in the preparatory steps and letting the veiling parameter z influence the comparison table C, can also be used in an alternative embodiment of the method which is presently described.

F. Transition from $\text{Add}_{2^L}$ to I(−)

Sections F and G relate to the transition between the $\text{Add}_{2^L}$ masking rule and a masking rule which is referenced here as the I(−)masking rule: This transition is needed, in particular, for the IDEA method and the IDEA multiplication defined in the introduction of the present document.

For M in N, let the transformation $I_M$: {0, 1, ..., M−1}→{1, 2, 3, ..., M} be defined by $I_M(0)$=M and $I_M(d)$=d for d≠0. For M=$2^{16}$, $I_M$ corresponds to the I transformation of the IDEA method defined in the introduction of the present document. To simplify matters, instead of $I_M$, merely the designation I will be used in the following.

According to the I(−)masking rule, the value d to be protected is represented by a masked representation y using a mask x, which is normally randomly selected, such that y=$\text{Add}_{M-1}$(x, I(d)) holds.

The transition methods described in sections F and G are based on the two following observations for M in N, which are similar to the two observations (*) and (**) already given above:

(***) For a, d ∈ {0, 1, ..., M−1}, let b=$\text{Add}_M$(d, a) and c=1(b−1, a). Then, $\text{Add}_{M+1}$(I(d), a)=$\text{Sub}_{M+1}$(b, c).

(****) For a ∈ {0, 1, ..., M} and d ∈ {0, 1, ..., M−1}, let b=$\text{Add}_{M+1}$ (I(d), a) and c=1(b−1, a). Then, $\text{Add}_M$(d, a)=$\text{Add}_M$(b, c).

Similar to sections D and E above, there is the problem of calculating $\text{Sub}_{M+1}$(b, c) or $\text{Add}_M$(b, c), respectively, in a way that is secure against DPA.

The method described in the present section is intended for M=$2^L$. The method receives three values x, y and u as input parameters, wherein y is a masked representation of a secret value d ∈ V(L) with the $\text{Add}_M$ masking rule and a mask x; that is to say that x+$_M$d=y holds. The value u ∈ {0, 1, ..., M} ⊂ V(L+1) provides the mask on the basis of which the masked representation, which is to be freshly calculated, is to be expressed after the masking rule transition. As an output, the method generates a value v ∈ V(L+1), which represents the masked representation of the secret value d using the I(−) masking rule and the mask u; that is to say that u+$_{M+1}$I(d)=v holds.

The method comprises preparatory steps (F.a) and (F.b) as well as steps (F.1)-(F.11) for the masking rule transition. Due to the similarity of the observations (*) and (***), the present method is very similar to that described in section D. The difference caused by the I(−)masking rule lies merely in step (F.5), which is modified as compared to step (D.3).

A further difference to the method described in section D is that the veiling parameter z is not only randomly selected once in a preparatory step, but is freshly randomly selected in each masking rule transformation. This possibility was already cited in section D as an alternative embodiment of the method which is described in said section, and the present method can serve as a model for necessary changes. Of course, the present method, similar to that in section D or also, to that described in the following section G, can be modified such that the veiling parameter z is determined earlier, namely in the preparatory steps.

The method is described here using parameters l, k and m, the values of which, as a rule, have already been fixed when implementing the method. The value l is a "small" factor of L, e.g., (L, l)=(16, 8) or (16, 4). The values k and m are given by k=L/l and m=$2^l$. The preparatory steps (F.a) and (F.b) of the method are:

(F.a) Select a random number r ∈ V(l) as a masking value.
(F.b) Generate the comparison table C[0, ..., m] with:

$C(0)=1$ and $C(i)=I(i-1,r)$ for $i=1, \ldots, m$.

For the masking rule transition, the following steps (F.1)-(F.11) are executed:

(F.1) Select a random bit z ∈ {0, 1} as a veiling parameter.

(F.2) Set $r' = r \oplus_l \overline{(z|\ldots|z)}^l \in V(l)$ and $a = \overline{(r'|\ldots|r')}^k \in V(L)$ (F.3) Calculate the value b=$Add_M$(a, d) from x, y and a.

(F.4) Set $b' = b \oplus_L \overline{(z|\ldots|z)}^L$; let $b' = (b'_k|\ldots|b'_1)$.

(F.5) Set c'=1−z.
(F.6) For j=1, ..., k, execute a loop with step (F.7):
(F.7) Set c'=C($b'_j$+1−c').
(F.8) Set u'=u, if z=0, and u'=$Sub_{M+1}$(M+1, u), if z=1.
(F.9) Calculate u'=$Sub_{M+1}$(u', c').
(F.10) Set u'=u', if z=0, and u'=$Sub_{M+1}$(M, u'), if z=1.
(F.11) Calculate v=$Sub_{M+1}$($Add_{M+1}$(u', b), a).

The notes and indications given in section D correspondingly apply to the method described here.

G. Transition from I(−) to $Add_{2^L}$

The method described in the present section executes a masking rule transformation in a direction that is opposite to the direction of the method in section F. The present method uses observation (****) of previous section F.

Let L in N, and let M=$2^L$. The method receives values x, y and u as input values, wherein y is a masked representation of a secret value d∈ V(L) with the I(−)masking rule and the mask x; that is to say that I(d)+$_{M+1}$x=y holds. The value u ∈ V(L) provides the mask of the masked representation to be calculated. As an output, the method generates a value v ∈ V(L) for which u+$_M$d=v holds. In other words, v is the masked representation of the secret value d with the $Add_M$ masking rule and the mask u.

The method comprises preparatory steps (G.a)-(G.c) and steps (G.1)-(G.9) for the masking rule transition. Due to the similarity of observations () and (**), the present method is very similar to that described in section E. The difference caused by the I(−)masking rule lies merely in steps (G.1) and (G.3), which are modified as compared to corresponding steps (E.3) and (E.5).

A further difference to the method described in section E is that, in the present method, the veiling parameter z is not randomly selected in each masking rule transformation, but only once in preparatory step (G.a). This possibility was already cited in section E as an alternative embodiment of the method which is described in said section, and the present method can serve as a model for the necessary changes. Of course, the present method, similar to that described in section E or also, to that described in the previous section F, can be modified such that the actual masking rule transformation comprises the determination of the veiling parameter z.

The method is described here using parameters l, k and m, the values of which have already been fixed, as a rule, when implementing the method. The value l is a "small" factor of L, e.g. (L, l)=(16, 8) or (16, 4). The values k and m are given by k=L/l and m=$2^l$. The preparatory method steps (G.a)-(G.c) are:

(G.a) Select a random bit z ∈ {0, 1} as a veiling parameter.
(G.b) Select a random number r ∈ V(l) as a masking value, and set $a = \overline{(r|\ldots|r)}^k \in V(L)$.

(G.c) Generate the table C[0, ..., m] with:

$C(0) = 1$ and $C(i) = I\left(i - 1, r \oplus_l \overline{(z|\ldots|z)}^l\right)$ for $i = 1, \ldots, m$.

For the masking rule transition, the following steps (G.1)-(G.9) are executed:

(G.1) Calculate the value b=$Add_{M+1}$(I(d), a) from x, y and a;
let b=($b_{k+1}|b_k| \ldots |b_1$) with $b_{k+1}$ ∈ {0, 1} and $b_k, \ldots, b_1$ ∈ V(l).

(G.2) Set $b' = (b_k|\ldots|b_1) \oplus_L \overline{(z|\ldots|z)}^L$; let $b' = (b'_k|\ldots|b'_1)$.

(G.3) Set c'=1−z.
(G.4) For j=1, ..., k execute a loop with step (G.5):
(G.5) Set c'=C($b'_j$+1−c').
(G.6) Set u'=u, if z=0, and u'=$Sub_M$(M−1, u), if z=1.
(G.7) Calculate u'=$Add_M$(u', c'$\oplus_1 b_{k+1}$).
(G.8) Set u'=u', if z=0, and u'=$Sub_M$(M, u'), if z=1.
(G.9) Calculate v=$Sub_M$($Add_M$(u', b), a).

The notes and indications given in section E correspondingly apply to the method described here.

From the example given in the following tables 1 to 4 it is clear that in the method which is presently described, all u' values and all status bit values of a processor occurring during the course of calculation are independent from the secret value d. The method, when implemented carefully, is therefore secured against a DPA attack.

The details cited in above sections A-G should not be taken as restrictions of the scope of protection of the invention, but rather should serve as examples of preferred embodiments. Many other modifications are possible and are obvious to the skilled person. Thus, the described methods can be easily modified, for example, in such a way that they can be used for the Sub$_M$ masking rule already mentioned in the introduction of the present document, instead of the Add$_M$ masking rule. Moreover, the modifications and notes set forth above in association with one transition method are, as a rule, also correspondingly applicable to the other methods. The scope of the invention should therefore not be determined by the described sample embodiments, but by the attached claims and their equivalents.

TABLE 1

Example for I(−) to Add $_{2^L}$ with L = 4, l = 2
z = 0, α = (r|r)

| | r = r' = 0, α = 00 | | | | | r = r' = 1, α = 11 | | | | |
|---|---|---|---|---|---|---|---|---|---|---|
| d | b | c | b' | c'$_0$ | c'$_1$ | b | c | b' | c'$_0$ | c'$_1$ |
| 00 | 00 | 1 | 0\|0 | 1 | 1 | 11 | 1 | 1\|1 | 1 | 1 |
| 01 | 01 | 0 | 0\|1 | 0 | 0 | 12 | 0 | 1\|2 | 0 | 0 |
| 02 | 02 | 0 | 0\|2 | 0 | 0 | 13 | 0 | 1\|3 | 0 | 0 |
| 03 | 03 | 0 | 0\|3 | 0 | 0 | 20 | 0 | 2\|0 | 1 | 0 |
| 10 | 10 | 0 | 1\|0 | 1 | 0 | 21 | 0 | 2\|1 | 1 | 0 |
| 11 | 11 | 0 | 1\|1 | 0 | 0 | 22 | 0 | 2\|2 | 0 | 0 |
| 12 | 12 | 0 | 1\|2 | 0 | 0 | 23 | 0 | 2\|3 | 0 | 0 |
| 13 | 13 | 0 | 1\|3 | 0 | 0 | 30 | 0 | 3\|0 | 1 | 0 |
| 20 | 20 | 0 | 2\|0 | 1 | 0 | 31 | 0 | 3\|1 | 1 | 0 |
| 21 | 21 | 0 | 2\|1 | 0 | 0 | 32 | 0 | 3\|2 | 0 | 0 |
| 22 | 22 | 0 | 2\|2 | 0 | 0 | 33 | 0 | 3\|3 | 0 | 0 |
| 23 | 23 | 0 | 2\|3 | 0 | 0 | 100 | 0 | 0\|0 | 1 | 1 |
| 30 | 30 | 0 | 3\|0 | 1 | 0 | 00 | 1 | 0\|0 | 1 | 1 |
| 31 | 31 | 0 | 3\|1 | 0 | 0 | 01 | 1 | 0\|1 | 1 | 1 |
| 32 | 32 | 0 | 3\|2 | 0 | 0 | 02 | 1 | 0\|2 | 1 | 1 |
| 33 | 33 | 0 | 3\|3 | 0 | 0 | 03 | 1 | 0\|3 | 1 | 1 |
| 100 | 100 | 0 | 0\|0 | 1 | 1 | 10 | 1 | 1\|0 | 1 | 1 |

TABLE 2

Example for I(−) to Add $_{2^L}$ with L = 4, l = 2
z = 0, α = (r|r)

| | r = r' = 2, α = 22 | | | | | r = r' = 3, α = 33 | | | | |
|---|---|---|---|---|---|---|---|---|---|---|
| d | b | c | b' | c'$_0$ | c'$_1$ | b | c | b' | c'$_0$ | c'$_1$ |
| 00 | 22 | 1 | 2\|2 | 1 | 1 | 33 | 1 | 3\|3 | 1 | 1 |
| 01 | 23 | 0 | 2\|3 | 0 | 0 | 100 | 0 | 0\|0 | 1 | 1 |
| 02 | 30 | 0 | 3\|0 | 1 | 0 | 00 | 1 | 0\|0 | 1 | 1 |
| 03 | 31 | 0 | 3\|1 | 1 | 0 | 01 | 1 | 0\|1 | 1 | 1 |
| 10 | 32 | 0 | 3\|2 | 1 | 0 | 02 | 1 | 0\|2 | 1 | 1 |
| 11 | 33 | 0 | 3\|3 | 0 | 0 | 03 | 1 | 0\|3 | 1 | 1 |
| 12 | 100 | 0 | 0\|0 | 1 | 1 | 10 | 1 | 1\|0 | 1 | 1 |
| 13 | 00 | 1 | 0\|0 | 1 | 1 | 11 | 1 | 1\|1 | 1 | 1 |
| 20 | 01 | 1 | 0\|1 | 1 | 1 | 12 | 1 | 1\|2 | 1 | 1 |
| 21 | 02 | 1 | 0\|2 | 1 | 1 | 13 | 1 | 1\|3 | 1 | 1 |
| 22 | 03 | 1 | 0\|3 | 0 | 1 | 20 | 1 | 2\|0 | 1 | 1 |
| 23 | 10 | 1 | 1\|0 | 1 | 1 | 21 | 1 | 2\|1 | 1 | 1 |
| 30 | 11 | 1 | 1\|1 | 1 | 1 | 22 | 1 | 2\|2 | 1 | 1 |
| 31 | 12 | 1 | 1\|2 | 1 | 1 | 23 | 1 | 2\|3 | 1 | 1 |
| 32 | 13 | 1 | 1\|3 | 0 | 1 | 30 | 1 | 3\|0 | 1 | 1 |
| 33 | 20 | 1 | 2\|0 | 1 | 1 | 31 | 1 | 3\|1 | 1 | 1 |
| 100 | 21 | 1 | 2\|1 | 1 | 1 | 32 | 1 | 3\|2 | 1 | 1 |

TABLE 3

Example for I(−) to Add $_{2^L}$ with L = 4, l = 2
z = 1, α = (r'|r')

| | r = 3, r' = 0, α = 00 | | | | | r = 2, r' = 1, α = 11 | | | | |
|---|---|---|---|---|---|---|---|---|---|---|
| d | b | c | b' | c'$_0$ | c'$_1$ | b | c | b' | c'$_0$ | c'$_1$ |
| 00 | 00 | 1 | 3\|3 | 0 | 0 | 11 | 1 | 2\|2 | 0 | 0 |
| 01 | 01 | 0 | 3\|2 | 1 | 1 | 12 | 0 | 2\|1 | 1 | 1 |

TABLE 3-continued

Example for I(−) to Add $_{2^L}$ with L = 4, l = 2
z = 1, α = (r'|r')

| | r = 3, r' = 0, α = 00 | | | | | r = 2, r' = 1, α = 11 | | | | |
|---|---|---|---|---|---|---|---|---|---|---|
| d | b | c | b' | c'$_0$ | c'$_1$ | b | c | b' | c'$_0$ | c'$_1$ |
| 02 | 02 | 0 | 3\|1 | 1 | 1 | 13 | 0 | 2\|0 | 1 | 1 |
| 03 | 03 | 0 | 3\|0 | 1 | 1 | 20 | 0 | 1\|3 | 0 | 1 |
| 10 | 10 | 0 | 2\|3 | 0 | 1 | 21 | 0 | 1\|2 | 0 | 1 |
| 11 | 11 | 0 | 2\|2 | 1 | 1 | 22 | 0 | 1\|1 | 1 | 1 |
| 12 | 12 | 0 | 2\|1 | 1 | 1 | 23 | 0 | 1\|0 | 1 | 1 |
| 13 | 13 | 0 | 2\|0 | 1 | 1 | 30 | 0 | 2\|3 | 0 | 1 |
| 20 | 20 | 0 | 1\|3 | 0 | 1 | 31 | 0 | 0\|2 | 0 | 1 |
| 21 | 21 | 0 | 1\|2 | 1 | 1 | 32 | 0 | 0\|1 | 1 | 1 |
| 22 | 22 | 0 | 1\|1 | 1 | 1 | 33 | 0 | 0\|0 | 1 | 1 |
| 23 | 23 | 0 | 1\|0 | 1 | 1 | 100 | 0 | 3\|3 | 0 | 0 |
| 30 | 30 | 0 | 0\|3 | 0 | 1 | 00 | 1 | 3\|3 | 0 | 0 |
| 31 | 31 | 0 | 0\|2 | 1 | 1 | 01 | 1 | 3\|2 | 0 | 0 |
| 32 | 32 | 0 | 0\|1 | 1 | 1 | 02 | 1 | 3\|1 | 1 | 0 |
| 33 | 33 | 0 | 0\|0 | 1 | 1 | 03 | 1 | 3\|0 | 1 | 0 |
| 100 | 100 | 0 | 3\|3 | 0 | 0 | 10 | 1 | 2\|3 | 0 | 0 |

TABLE 4

Example for I(−) to Add $_{2^L}$ with L = 4, l = 2
z = 1, α = (r'|r')

| | r = 1, r' = 2, α = 22 | | | | | r = 0, r' = 3, α = 33 | | | | |
|---|---|---|---|---|---|---|---|---|---|---|
| d | b | c | b' | c'$_0$ | c'$_1$ | b | c | b' | c'$_0$ | c'$_1$ |
| 00 | 22 | 1 | 1\|1 | 0 | 0 | 33 | 1 | 0\|0 | 0 | 0 |
| 01 | 23 | 0 | 1\|0 | 1 | 1 | 100 | 0 | 3\|3 | 0 | 0 |
| 02 | 30 | 0 | 0\|3 | 0 | 1 | 00 | 1 | 3\|3 | 0 | 0 |
| 03 | 31 | 0 | 0\|2 | 0 | 1 | 01 | 1 | 3\|2 | 0 | 0 |
| 10 | 32 | 0 | 0\|1 | 0 | 1 | 02 | 1 | 3\|1 | 0 | 0 |
| 11 | 33 | 0 | 0\|0 | 1 | 1 | 03 | 1 | 3\|0 | 0 | 0 |
| 12 | 100 | 0 | 3\|3 | 0 | 1 | 10 | 1 | 2\|3 | 0 | 0 |
| 13 | 00 | 1 | 3\|3 | 0 | 0 | 11 | 1 | 2\|2 | 0 | 0 |
| 20 | 01 | 1 | 3\|2 | 0 | 0 | 12 | 1 | 2\|1 | 0 | 0 |
| 21 | 02 | 1 | 3\|1 | 0 | 0 | 13 | 1 | 2\|0 | 0 | 0 |
| 22 | 03 | 1 | 3\|0 | 1 | 0 | 20 | 1 | 1\|3 | 0 | 0 |
| 23 | 10 | 1 | 2\|3 | 0 | 0 | 21 | 1 | 1\|2 | 0 | 0 |
| 30 | 11 | 1 | 2\|2 | 0 | 0 | 22 | 1 | 1\|1 | 0 | 0 |
| 31 | 12 | 1 | 2\|1 | 0 | 0 | 23 | 1 | 1\|0 | 0 | 0 |
| 32 | 13 | 1 | 2\|0 | 1 | 0 | 30 | 1 | 0\|3 | 0 | 0 |
| 33 | 20 | 1 | 1\|3 | 0 | 0 | 31 | 1 | 0\|2 | 0 | 0 |
| 100 | 21 | 1 | 1\|2 | 0 | 0 | 32 | 1 | 0\|1 | 0 | 0 |

The invention claimed is:

1. A method for transitioning from a first masked representation of a value to be kept secret to a second masked representation of the same value, wherein the value to be kept secret is prevented from being spied out, wherein the first masked representation is based on a first masking rule having a first mask and the second masked representation is based on a second masking rule having a second mask, the first masking rule being different from the second masking rule, and wherein, in transitioning from the first masked representation to the second masked representation, at least one previously calculated table having a plurality of entries is used and at least one calculation is carried out dependent on at least one randomly chosen veiling parameter, wherein the at least one randomly chosen veiling parameter is at least one parameter further to the first and second masks, and wherein the at least one randomly chosen veiling parameter influences the transitioning from the first masked representation to the second masked representation, thereby providing protection against an attack in which a plurality of calculation runs are statistically evaluated, wherein a table index of the table or of at least one of the tables, respectively, has a bit length that is smaller than the bit length of at least one of the first masked representation and the second masked representation, and wherein, in transitioning from the first masked representation to the second masked representation, repeated access takes place to the table or at least one of the tables, respectively, wherein operations of the method comprise:

determining a third masked representation of the value to be kept secret, wherein the third masked representation is based on the first masking rule having a third mask;

transforming the third masked representation into a fourth masked representation of the value to be kept secret using the table or at least one of the tables, respectively, wherein the fourth masked representation is based on the second masking rule having a fourth mask; and determining the second masked representation of the value to be kept secret from the fourth masked representation, wherein each operation of the method is executed by one or more processors on a smart card or chip module.

2. The method according to claim 1, wherein each entry in the table or each entry in at least one of the tables, respectively, is dependent on at least one predetermined masking value.

3. The method according to claim 2, wherein the table or at least one of the tables, respectively, is a comparison table which for each table index, provides the result of a comparison between a value dependent on the table index and a value dependent on the masking value or at least one of the masking values, respectively.

4. The method according to claim 3, wherein the comparison table is applied repeatedly to successive sections of an intermediate result, in order to determine respective carry values.

5. The method according to claim 1, wherein, while executing the method, the values of status bits of a processor are statistically independent from the value to be kept secret.

6. A method for transitioning from a first masked representation of a value to be kept secret to a second masked representation of the same value, wherein the value to be kept secret is prevented from being spied out, wherein the first masked representation is based on a first masking rule having a first mask and the second masked representation is based on a second masking rule having a second mask, the first masking rule being different from the second masking rule, and wherein, in transitioning from the first masked representation to the second masked representation, at least one previously calculated table having a plurality of entries is used and at least one calculation is carried out dependent on at least one randomly chosen veiling parameter, wherein the at least one randomly chosen veiling parameter is at least one parameter further to the first and second masks, and wherein the at least one randomly chosen veiling parameter influences the transitioning from the first masked representation to the second masked representation, thereby providing protection against an attack in which a plurality of calculation runs are statistically evaluated, wherein, in transitioning from the first masked representation to the second masked representation, at least one intermediate result is used in a complemented or non-complemented way, depending on the randomly chosen veiling parameter or at least one of the randomly chosen veiling parameters, respectively, wherein operations of the method comprise:

determining a third masked representation of the value to be kept secret, wherein the third masked representation is based on the first masking rule having a third mask;

transforming the third masked representation into a fourth masked representation of the value to be kept secret using the table or at least one of the tables, respectively, wherein the fourth masked representation is based on the second masking rule having a fourth mask; and determining the second masked representation of the value to be kept secret from the fourth masked representation, wherein each operation of the method is executed by one or more processors on a smart card or chip module.

7. The method according to claim 6, wherein a table index of the table or of at least one of the tables, respectively, has a bit length which is smaller than the bit length of at least one of the first masked representation and the second masked representation, and wherein, in determining the second masked representation repeated access takes place to the table or at least one of the tables, respectively.

8. The method according to claim 6, wherein each entry in the table or each entry in at least one of the tables, respectively, is dependent on at least one predetermined masking value.

9. The method according to claim 8, wherein the table or at least one of the tables, respectively, is a comparison table which for each table index, provides the result of a comparison between a value dependent on the table index and a value dependent on the masking value or at least one of the masking values, respectively.

10. The method according to claim 9, wherein the comparison table is applied repeatedly to successive sections of an intermediate result, in order to determine respective carry values.

11. The method according to claim 6, wherein, while executing the method, the values of status bits of a processor are statistically independent from the value to be kept secret.

12. A computer-implemented method on a smart card or chip module for transitioning from a first masked representation of a value to be kept secret to a second masked representation of the same value, wherein the value to be kept secret is prevented from being spied out, wherein the first masked representation is based on a first masking rule having a first mask and the second masked representation is based on a second masking rule having a second mask, the first masking rule being different from the second masking rule, and wherein, in calculating the second masked representation, at least one previously calculated table having a plurality of entries is used and the calculation is carried out dependent on at least one randomly chosen veiling parameter, wherein the at least one randomly chosen veiling parameter is at least one parameter further to the first and second masks, and wherein the at least one randomly chosen veiling parameter influences the calculation of the second masked representation, thereby providing protection against an attack in which a plurality of calculation runs are statistically evaluated, wherein a table index of the table or of at least one of the tables, respectively, has a bit length that is smaller than the bit length of at least one of the first masked representation and the second masked representation, and wherein, in determining the second masked representation, repeated access takes place to the table or at least one of the tables, respectively, and wherein, while executing the method, the values of status bits of a processor are statistically independent from the value to be kept secret.

13. The method according to claim 12, wherein each entry in the table or each entry in at least one of the tables, respectively, is dependent on at least one predetermined masking value.

14. The method according to claim 13, wherein the table or at least one of the tables, respectively, is a comparison table which for each table index, provides the result of a comparison between a value dependent on the table index and a value dependent on the masking value or at least one of the masking values, respectively.

15. The method according to claim 14, wherein the value dependent on the masking value or at least one of the masking values, respectively, depends either on the complemented or the non-complemented masking value, depending on the veiling parameter or at least one of the veiling parameters, respectively.

16. The method according to claim 14, wherein each entry in the comparison table provides a binary value.

17. The method according to claim 14, wherein the comparison table is applied repeatedly to successive sections of an intermediate result, in order to determine respective carry values.

18. A method for transitioning from a first masked representation of a value to be kept secret to a second masked representation of the same value, wherein the value to be kept secret is prevented from being spied out, wherein the first masked representation is based on a first masking rule having a first mask and the second masked representation is based on a second masking rule having a second mask, the first masking rule being different from the second masking rule, the method comprising executing a calculation using at least one comparison table which provides, for each table index, the result of a comparison between a value dependent on the table index and a value dependent on at least one masking value, wherein the value dependent on the masking value or at least one of the masking values, respectively, depends either on the complemented or the non-complemented masking value, depending on the veiling parameter or at least one of the veiling parameters, respectively, wherein operations of the method comprise:

determining a third masked representation of the value to be kept secret, wherein the third masked representation is based on the first masking rule having a third mask;

transforming the third masked representation into a fourth masked representation of the value to be kept secret using the table or at least one of the tables, respectively, wherein the fourth masked representation is based on the second masking rule having a fourth mask; and determining the second masked representation of the value to be kept secret from the fourth masked representation, wherein each operation of the method is executed by one or more processors on a smart card or chip module.

19. The method according to claim 18, wherein each entry in the comparison table provides a binary value.

20. The method according to claim 18, wherein, while executing the method, the values of status bits of a processor are statistically independent from the value to be kept secret.

21. A computer-implemented method on a smart card or chip module for transitioning from a first masked representation of a value to be kept secret to a second masked representation of the same value, wherein the value to be kept secret is prevented from being spied out, wherein the first masked representation is based on a first masking rule having a first mask and the second masked representation is based on a second masking rule having a second mask, the first masking rule being different from the second masking rule, the method comprising executing a calculation using at least one comparison table which provides, for each table index, the result of a comparison between a value dependent on the table index and a value dependent on at least one masking value, wherein the comparison table is applied repeatedly to successive sections of an intermediate result, in order to determine respective carry values, wherein, while executing the method, the values of status bits of a processor are statistically independent from the value to be kept secret.

22. A computer-implemented method on a smart card or chip module for transitioning from a first masked representation of a value to be kept secret to a second masked representation of the same value, wherein the value to be kept secret is prevented from being spied out, wherein the first masked representation is based on a first masking rule having a first mask and the second masked representation is based on a second masking rule having a second mask, the first masking rule being different from the second masking rule, the method comprising executing a calculation using at least one comparison table which provides, for each table index, the result of a comparison between a value dependent on the table index and a value dependent on at least one masking value, wherein the value dependent on the masking value or at least one of the masking values, respectively, depends either on the complemented or the non-complemented masking value, depending on the veiling parameter or at least one of the veiling parameters, respectively, wherein, while executing the method, the values of status bits of a processor are statistically independent from the value to be kept secret.

23. The method according to claim 22, wherein, in determining the second masked representation, at least one intermediate result is used in a complemented or non-complemented way, depending on the veiling parameter or at least one of the veiling parameters, respectively.

24. The method according to claim 22, wherein a table index of the table or of at least one of the tables, respectively, has a bit length which is smaller than the bit length of at least one of the first masked representation and the second masked representation, and wherein, in determining the second masked representation repeated access takes place to the table or at least one of the tables, respectively.

25. The method according to claim 22, wherein the second mask is freely selectable.

26. The method according to claim 22, wherein the table or at least one of the tables, respectively, is predetermined or is calculated in a preparatory method step.

27. A non-transitory computer-readable storage medium having stored thereon a computer program, the computer program having a plurality of program instructions which cause at least one processor on a smart card or chip module to execute operations for transitioning from a first masked representation of a value to be kept secret to a second masked representation of the same value, wherein the value to be kept secret is prevented from being spied out, wherein the first masked representation is based on a first masking rule having a first mask and the second masked representation is based on a second masking rule having a second mask, the first masking rule being different from the second masking rule, and wherein, in calculating the second masked representation, at least one previously calculated table having a plurality of entries is used and the calculation is carried out dependent on at least one randomly chosen veiling parameter, wherein the at least one randomly chosen veiling parameter is at least one parameter further to the first and second masks, and wherein the at least one randomly chosen veiling parameter influences the calculation of the second masked representation, thereby providing protection against an attack in which a plurality of calculation runs are statistically evaluated, wherein, in determining the second masked representation, at least one intermediate result is used in a complemented or non-complemented way, depending on the randomly chosen veiling parameter or at least one of the randomly chosen veiling parameters, respectively, and wherein the program instructions cause the at least one processor on the smart card or chip module to execute the operations such that the values of status bits of the processor are statistically independent from the value to be kept secret.

28. The non-transitory computer-readable storage medium of claim 27, wherein the non-transitory computer-readable storage medium is a portable data carrier.

29. A computer-implemented method on a smart card or chip module for transitioning from a first masked representation of a value to be kept secret to a second masked representation of the same value, wherein the value to be kept secret is prevented from being spied out, wherein the first masked representation is based on a first masking rule having a first mask and the second masked representation is based on a second masking rule having a second mask, the first masking rule being different from the second masking rule, and wherein, in calculating the second masked representation, at least one previously calculated table having a plurality of entries is used, and wherein the calculation is carried out dependent on at least one randomly chosen veiling parameter, wherein the at least one randomly chosen veiling parameter is at least one parameter further to the first and second masks, and wherein the at least one randomly chosen veiling parameter influences the calculation of the second masked representation, thereby providing protection against an attack in which a plurality of calculation runs are statistically evaluated, wherein, in determining the second masked representation, at least one intermediate result is used in a complemented or non-complemented way, depending on the randomly chosen veiling parameter or at least one of the randomly chosen veiling parameters, respectively, wherein, while executing the method, the values of status bits of a processor are statistically independent from the value to be kept secret.

30. The method according to claim 29, wherein a table index of the table or of at least one of the tables, respectively, has a bit length which is smaller than the bit length of at least one of the first masked representation and the second masked representation, and wherein, in determining the second masked representation repeated access takes place to the table or at least one of the tables, respectively.

31. The method according to claim 29, wherein the second mask is freely selectable.

32. The method according to claim 29, wherein the table or at least one of the tables, respectively, is predetermined or is calculated in a preparatory method step.

* * * * *